US007491820B2

(12) United States Patent
    Sleeter

(10) Patent No.: US 7,491,820 B2
(45) Date of Patent: Feb. 17, 2009

(54) HYDROGENATION WITH COPPER COMPOSITIONS CATALYST

(75) Inventor: Ronald T. Sleeter, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 79 days.

(21) Appl. No.: 11/407,193

(22) Filed: Apr. 20, 2006

(65) Prior Publication Data

US 2006/0241313 A1    Oct. 26, 2006

Related U.S. Application Data

(60) Provisional application No. 60/674,707, filed on Apr. 26, 2005.

(51) Int. Cl.
    *C07C 51/36* (2006.01)
(52) U.S. Cl. ..................... 544/144; 544/141
(58) Field of Classification Search ............... 544/141, 544/144
    See application file for complete search history.

(56) References Cited

U.S. PATENT DOCUMENTS

| | | | |
|---|---|---|---|
| 2,369,446 A * | 2/1945 | Dressler et al. | ............. 530/209 |
| 2,568,639 A | 9/1951 | Johnson | |
| 3,271,410 A | 9/1966 | Cagneron et al. | |
| 3,278,568 A | 10/1966 | de Jonge et al. | |
| 3,515,678 A | 6/1970 | Koritala | |
| 3,743,662 A | 7/1973 | Eurlings et al. | |
| 3,749,681 A * | 7/1973 | Koritala | ......................... 502/10 |
| 3,758,532 A | 9/1973 | Gibble | |
| 3,856,710 A | 12/1974 | Moulton et al. | |
| 3,925,490 A | 12/1975 | Reich et al. | |
| 4,134,905 A | 1/1979 | Hasman | |
| 4,169,844 A | 10/1979 | Hasman | |
| 4,174,300 A | 11/1979 | Koritala | |
| 4,209,547 A | 6/1980 | Scarpiello et al. | |
| 4,278,609 A | 7/1981 | Kuiper | |
| 4,591,579 A * | 5/1986 | Lok et al. | ................... 502/244 |
| 5,475,160 A | 12/1995 | Singleton et al. | |
| 5,795,969 A | 8/1998 | Fehr et al. | |
| 5,863,589 A | 1/1999 | Covington, Jr. et al. | |
| 5,986,118 A | 11/1999 | Fehr et al. | |
| 6,265,596 B1 | 7/2001 | Harrod et al. | |
| 6,703,342 B1 | 3/2004 | Lok | |
| 6,716,155 B2 * | 4/2004 | Sleeter | ........................ 554/144 |
| 6,846,772 B2 | 1/2005 | Lok et al. | |
| 2005/0027136 A1 | 2/2005 | Toor et al. | |
| 2006/0035794 A1 | 2/2006 | Graiver et al. | |
| 2008/0091039 A1 | 4/2008 | Sleeter | |
| 2008/0214852 A1 | 9/2008 | Sleeter | |

FOREIGN PATENT DOCUMENTS

| DE | 37 18 352 A1 | 12/1988 |
|---|---|---|
| GB | 366025 | 1/1932 |
| GB | 394073 | 6/1933 |
| GB | 670 906 A | 4/1952 |
| GB | 1 256 610 A | 12/1971 |
| GB | 1 369 044 A | 10/1974 |
| GB | 1486169 A | 9/1977 |
| JP | 2002-115100 A | 4/2002 |
| JP | 2002-326813 A | 11/2002 |
| WO | WO 98/22558 | 5/1998 |
| WO | WO 2006/116313 A2 | 11/2006 |

OTHER PUBLICATIONS

Johansson et al. "Copper Catalyst in the Selecive Hydrogenati of soybean and Rapeseed Oils: 1. The activity of the Copper Chrimite Catalyst", 1979, Journal of the American Oil Chemists' Society, vol. 56, pp. 974.*

Li et al. "Hydrogenation of Fats and Oils", 1988, Riyong Huaxue Gongye, vol. 4, (Abstract STN:Caplus).*

Tyutyunnikov, B.N. et al., Compositon and characteristics of copper-containing catalyst i the dycrogenation of sunflower and soybean oils, 1997, Politekh. Inst. im. Lenina, Kharkov, USSR. Maslozhirovaya promyshiennost, Caplus database abstract, English translation.*

Knothe, G. et al., Biodiesel: The use of Vegetable oils and their Derivatives a Alternative Diesel Fuels, 1997, American Chemical Society, pp. 172-207.*

Bansal, J.D and deMan, J.M., "Effect of Hydrogenation on the Chemical Composition of Canola Oil," *J. Food Sci. 47*: 1338-1344, Institute of Food Technologists (1982).

Beal, R.E., et al., "Removal of Copper From Hydrogenated Soybean Oil," *J. Am. Oil Chem. Soc. 46*: 498-500, American Oil Chemists Society (1969).

Degussa Catalysts, "B 3113, Activated Copper Catalyst," accessed online at http://www2.sivento.de/sivento/catalysts/html/e/solutions_products/datasheet/catalysts_data, Degussa Catalysts, 2 pages (accessed Mar. 2005).

Degussa Catalysts, "Mannitol Production, Ni catalysts Technology," accessed online at http://www2.sivento.de/sivento/catalysts/html/e/solutions_products/datasheet/catalysts_reaction, Degussa Catalysts, 2 pages (accessed Mar. 2005).

DeJonge, A., et al., "Selective hydrogenation of linolenate groups in soya-bean oil," *Nature 206*: 573-574, Nature Publishing Group (1965).

(Continued)

*Primary Examiner*—Daniel M Sullivan
*Assistant Examiner*—Yate' K Cutliff
(74) *Attorney, Agent, or Firm*—Sterne, Kessler, Goldstein, Fox, P.L.L.C.

(57) ABSTRACT

Copper compositions that are useful as hydrogenation catalysts are disclosed. In particular, the copper compounds are catalysts for the selective hydrogenation of oils that contain unsaturated fatty acyl components such as unsaturated vegetable oils. Methods of preparing the copper compositions are also disclosed. Methods of hydrogenating unsaturated compositions that contain at least two sites of unsaturation using the hydrogenation catalysts, along with products obtained from the hydrogenation reactions described herein are also disclosed.

16 Claims, No Drawings

OTHER PUBLICATIONS

Dijkstra, A.J., "On the mechanism of the copper-catalysed hydrogenation; a reinterpretation of published data," *Eur. J. Lipid Sci. Technol. 104*: 29-35, Wiley-VCH (2002).

Dutton, H.J., et al., "The Flavor Problem of Soybean Oil. VIII. Linolenic Acid," *J. Am. Oil Chem. Soc. 28*: 115-118, American Oil Chemists Society (1951).

Frankel, E.N. and Little, F.L., "Homogenous Catalytic Hydrogenation of Unsaturated Fats: Group VIB Metal Carbonyl Complexes," *J. Am. Oil Chem. Soc. 46*: 256-261, American Oil Chemists Society (1969).

Furlong, K., "The Low Trans Challenge," *Oils and Fats International*: 30-31, DMG World Media (UK) Ltd. (2004).

Hebert, T.M., "Hydrogenation of Edible Oils," accessed online at http://www.che.lsu.edu/COURSES/4205/2000/Hebert/paper.htm, Louisiana State Unviersity, 2 pages (accessed 2004).

Heldal, J.A. and Mork, P.C., "Chlorine-Containing Compounds as Copper Catalyst Poisons," *J. Am. Oil Chem. Soc. 59*: 396-398, American Oil Chemists Society (1982).

Johansson, L.E. and Lundin, S.T., "Copper Catalysts in the Selective Hydrogenation of Soybean and Rapeseed Oils: I. The Activity of the Copper Chromite Catalyst," *J. Am. Oil Chem. Soc. 56*: 974-980, American Oil Chemists Society (1979).

Johansson, L.E. and Lundin, S.T., "Copper Catalysts in the Selective Hydrogenation of Soybean and Rapeseed Oils: II. The Effect of a Hydrogen Flow Over Copper Chromite Catalysts," *J. Am. Oil Chem. Soc. 56*: 981-986, American Oil Chemists Society (1979).

Johansson, L.E., "Copper Catalysts in the Selective Hydrogenation of Soybean and Rapeseed Oils: III. The Effect of Pressure when using Copper Chromite Catalyst," *J. Am. Oil Chem. Soc. 56*: 987-991, American Oil Chemists Society (1979).

Koritala, S., "Selective Hydrogenation of Soybean Oil. III. Copper-Exchanged Molecular Sieves and Other Supported Catalysts," *J. Am. Oil Chem. Soc. 45*: 197-200, American Oil Chemists Society (1968).

Koritala, S., "Stereospecific Hydrogenation of Stearolate with Copper Catalysts," *J. Am. Oil Chem. Soc. 45*: 708, American Oil Chemists Society (1968).

Koritala, S., "Selective Hydrogenation With Copper Catalysts: III. Hydrogen Addition and Isomerization," *J. Am. Oil Chem. Soc. 47*: 269-272, American Oil Chemists Society (1970).

Koritala, S. and Dutton, H.J., "Selective Hydrogenation of Soybean Oil. II. Copper-Chromium Catalysts," *J. Am. Oil Chem. Soc. 43*: 556-558, American Oil Chemists Society (1966).

Koritala, S. and Dutton, H.J., "Selective Hydrogenation of Soybean Oil: IV. Fatty Acid Isomers Formed With Copper Catalysts," *J. Am. Oil Chem. Soc. 46*: 245-248, American Oil Chemists Society (1969).

Koritala, S. and Dutton, H.J., " Selective Hydrogenation of Soybean Oil with Sodium Borohydride-Reduced Catalysts," *J. Am. Oil Chem. Soc. 43*: 86-89, American Oil Chemists Society (1966).

Koritala, S. and Scholfield, C.R., "Selective Hydrogenation With Copper Catalysts: I. Isolation and Identification of Isomers Formed During Hydrogenation of Linolenate," *J. Am. Oil Chem. Soc. 47*: 262-265, American Oil Chemists Society (1970).

Koritala, S., et al., "Selective Hydrogenation With Copper Catalysts: II. Kinetics," *J. Am. Oil Chem. Soc. 47*: 266-268, American Oil Chemists Society (1970).

Laubli, M.W. and Bruttel, P.A., Determination of the Oxidative Stability of Fats and Oils: Comparison between the Active Oxygen Method (AOCS Cd 12-57) and the Rancimat Method, *J. Am. Oil Chem. Soc. 63*: 792-795, American Oil Chemists Society (1986).

Mangnus, G. and Beers, A., "Hydrogenation of oils at reduced TFA content," *Oils & Fats International 20*: 33-35, DMG World Media (UK) Ltd. (2004).

Marsili, R., "Controlling the Quality of Fats and Oils," *Food Product Design*, accessed online at http://www.foodproductdesign.com/archive/1993/0493QA.html, Weeks Publishing Company, 9 pages (accessed 2004).

Moulton, K.J., et al., "Pilot-Plant Selective Hydrogenation of Soybean Oil: Activation and Evaluaton of Copper-Containing Catalysts," *J. Am. Oil Chem. Soc. 46*: 662-666, American Oil Chemists Society (1969).

Moulton, K.J., et al., "Hydrogenation of Soybean Oil With Commercial Copper-Chromite and Nickel Catalysts: Winterization of Low-Linolenate Oils," *J. Am. Oil Chem. Soc. 48*: 499-502, American Oil Chemists Society (1971).

Parekh, H.S. and Hsu, A.C.T., "Preparation of Synthetic Malachite," *I & EC Product Res. Devel. 7*: 222-226, American Chemical Society (1968).

Popescu, O, et al., "High Oleic Oils by Selective Hydrogenation of Soybean Oil," *J. Am. Oil Chem. Soc. 46*: 97-99, American Oil Chemists Society (1969).

Stockhausen, C.J., ed., "Sizzling Test Results Boost Demand for New Soybean Oil," 1% *Linolenic Soybean Oil*, accessed online at http://www.notrans.iastate.edu/, Iowa State University, 5 pages (2004).

Thompson, S., "New ISU Soybean Oil Passes the "Fry Test, *Agriculture in Action*, accessed online at http://www.ag.iastate.edu/aginfo/agaction.php?date=2004-03-11&function=view, Iowa State University, 2 pages (2004).

Vigneron, P.Y., et al., "Kinetics of Copper-Chromite Hydrogenation in Soybean and Linseed Oils: Effect of Pressure," *J. Am. Oil Chem. Soc. 49*: 371-375, American Oil Chemists Society (1972).

Firestone, D., ed., "Fat Stability, Active Oxygen Method," in *Official Methods and Recommended Practices of the American Oil Chemists' Society*, American Oil Chemists' Society, Champaign, IL, pp. 1-4 (1990).

Hui, Y.H., ed., "Vegetable Oil Hydrogenation," in *Bailey's Industrial Oil and Fat Products, 5th Ed.*, John Wiley & Sons, Inc., New York, NY, pp. 527-537 (1996).

Drozdowski, B. and Nowak-Polomska, G., "Improvement of the oxidative stability of rapeseed oil by hydrogenation in the presence of copper catalysts," *Tlueszcze Jadalne 28*: 17-29 (1990).

English language translation of Drozdowski, B. and Nowak-Polomska, G., "Improvement of the oxidative stability of rapeseed oil by hydrogenation in the presence of copper catalysts," *Tlueszcze Jadalne 28*: 17-29 (1990).

Koritala, S., "Selective Hydrogenation of Soybean Oil: V. A Novel Copper Catalyst With Excellent Re-use Properties," *J. Am. Oil Chem. Soc., Abstract*, pp. 106-107 (1970).

English language abstract of HU 5779, 1 page, CAPlus Database, Accession No. 1973:506537.

Patent Abstracts of Japan, English language abstract of JP 2002-115100 A, 2 pages (Document FP3 listed on accompanying PTO/SB/08A).

Patent Abstracts of Japan, English language abstract of JP 2002-326813 A, 2 pages (Document FP4 listed on accompanying PTO/SB/08A).

Sinfelt, J.H., "Structure of metal catalysts," *Rev. Mod. Phys. 51*:569-590, American Physical Society (1979).

International Search Report for International Application No. PCT/US2006/015473, mailed on Nov. 2, 2006, European Patent Office, Netherlands.

U.S. Non-Provisional Patent Application No. 11/871,747, inventor Sleeter, R.T., filed Oct. 12, 2007.

U.S. Non-Provisional Patent Application No. 11/980,536, inventor Sleeter, R.T., filed Oct. 31, 2007.

\* cited by examiner

HYDROGENATION WITH COPPER COMPOSITIONS CATALYST

CROSS REFERENCE TO RELATED APPLICATIONS

This application claims the benefit of U.S. Provisional Application No. 60/674,707, filed Apr. 26, 2005, which is incorporated by reference herein in its entirety.

BACKGROUND OF THE INVENTION

1. Field of the Invention

The present invention is directed to copper catalysts useful for hydrogenating unsaturated compositions, methods of preparing the catalysts, methods of hydrogenating unsaturated compositions and the hydrogenated products obtained therefrom.

2. Background of the Invention

The hydrogenation of unsaturated substrates is a technology widely used for obtaining products which can be used in various fields, from the food industry to the field of plastic materials and the like. Several methods are known for hydrogenation (a chemical reduction by means of adding hydrogen across a double bond), most of which use gaseous hydrogen in the presence of a suitable catalyst. The latter normally comprises a transition metal, usually a metal of group 10 of the periodic table, i.e., Ni, Pd or Pt. If these are present as impurities in the hydrogenated substrate, they can cause oxidation or toxicological problems in the case of food. Hydrogenation catalysts based on other transition metals having fewer drawbacks than those listed above are also known, but these also have a lower catalytic activity.

Hydrogenation of plant oils removes or reduces the amount of components in the oil responsible for offensive odors, poor taste and poor stability. Thus, hydrogenation provides plant oils that are useful as components for many nutritional products such as nutraceuticals and food, and for food preparation such as frying oils.

Soybean (i.e., *Glycine max* L. Merr.) seeds are recognized to represent one of the most important oilseed crops presently being grown in the world. Such seeds provide an excellent source of vegetable oil. While soybean oil represents an important worldwide food source, flavor and oxidative stability problems associated with its customary fatty acid composition reduces its attractiveness in some applications.

Oxidative stability relates to how easily components of an oil oxidize which creates off-flavors in the oil, and is measured by instrumental analysis such as Oil Stability Index or Accelerated Oxygen Method (AOM). The degree of oxidative stability is rated as the number of hours to reach a peroxide value of 100.

Soybean oil contains five different fatty acids (in the form of fatty acid acylglycerol esters) as its major components. These five fatty acids are: palmitic acid (C16:0) which averages about 11 percent by weight; stearic acid (C18:0) which averages about 4 percent by weight; oleic acid (C18:1) which averages about 20 percent by weight; linoleic acid (C18:2) which averages about 57 percent by weight; and linolenic acid (C18:3) which averages about 8 percent by weight of the total fatty acids. The stability problem which influences the flavor of soybean oil has been attributed to the oxidation of its fatty acids, and particularly to the oxidation of the linolenic acid (C18:3) component.

Oxidized fatty acids decompose to form volatile flavor-imparting compounds. The relative order of sensitivity to oxidation is linolenic>linoleic>oleic>saturates. Linolenic acid has been known to be the primary precursor for undesirable odor and flavor development. Since commodity soybean oil currently marketed today contains relatively high amounts of linolenic acid (7-10%) compared to other food oils such as corn oil which has about 1%, its use is constricted unless it has been hydrogenated. As a general rule the linolenic acid content should be below 1-2% in order to have the widest food application and to qualify for rigorous use environments such as for frying oils.

Soybean oil suffers from a lack of stability for frying applications due to its relatively high concentration of linolenic acid of 7 to 10%. This causes the oil to oxidize rapidly and generate off flavors and also causes early breakdown in the frying applications, resulting in premature foaming and darkening. Frying stability can be enhanced if the linolenic acid concentration can be reduced.

To address the flavor and stability problems of soybean oil due to the linolenic acid content, various processing approaches have been proposed. Such processing of the soybean vegetable oil includes: (1) minimizing the ability of the fatty acids to undergo oxidation by adding metal chelating agents, antioxidants, or packaging in the absence of oxygen; or (2) the elimination of the endogenous linolenic acid by selective hydrogenation. These approaches have not been entirely satisfactory. The additional processing is expensive, time consuming, commonly ineffective, and frequently generates undesirable by-products. While selective hydrogenation to reduce the linolenic acid content may improve oil stability somewhat, this also generates positional and geometric isomers of the unsaturated fatty acids that are not present in the natural soybean oil.

Hydrogenation can be used to improve performance attributes by lowering the amount of linolenic and linoleic acids in the oil. In this process the oil increases in saturated and trans fatty acids, both undesirable when considering health implications. In many instances, the increase in trans fatty acids is proportional to the amount of linolenic acid in the starting oil.

Due to increased knowledge of the behavior of trans fats, i.e. trans fatty acid esters, in the human body and concerns of their contributing to coronary heart disease, it is recommended that the intake of trans fats be reduced. Research has shown that diets high in saturated fats increase low density lipoproteins, which promote the deposition of cholesterol on blood vessels. More recently, dietary consumption of foods high in trans fatty acids have also been linked to a lowering of high density lipoprotein relative to low density lipoprotein and to cause an increase in inflammation. In the United States, food companies are required to label the trans content of their products above a threshold level. This has added impetus to lower the amount of trans fats in foods, particularly foods relatively high in oil, such as fried foods, including potato chips, etc. However, hydrogenation remains the primary option to convert an unstable oil to a stable oil.

Thus, polyunsaturated oils are hydrogenated to reduce the degree of unsaturation in the oil, prior to subsequent processing to obtain secondary products, such as food grade oils, additives, lubricants and the like. The content of linolenic acid (C18:3) in the oil is reduced by hydrogenation to a more saturated oil, containing increased amounts of the monoene (C18:1) and diene (C18:2).

Reduction of the double bond content in polyunsaturated oils is traditionally carried out by partial hydrogenation, catalyzed by a transition metal catalyst. Various transition metals, such as nickel, palladium and platinum have been used as hydrogenation catalysts. Catalysts vary in degree of selectivity. The selectivity referred to in this context is the ability of preferentially reducing linolenic acid before linoleic acid and oleic acid. Selectivity in this context also applies to the ability of a catalyst to reduce by hydrogenating only to form monoenes, without reducing to full saturation. Precious metal catalysts are generally the most active and also the least selective. They typically produce high amounts of saturated fatty acids for a minimal reduction of linolenic acid. Nickel catalysts are more selective and have a greater preference for reducing linolenic acid to monoene while producing less saturates. However, copper-chromium combination catalysts (i.e., copper chromite catalyst) have hitherto been found to be the most selective for production of the monoene. The hydrogenation of the polyunsaturated oils with copper chromite can produce the corresponding monoene, with little or no production of the saturated fatty acid.

Nickel catalyzed hydrogenation uses small amounts of catalyst for relatively short periods of time to reduce the linolenic acid content to the desired range, which is often 1.5%. The oil may then additionally be winterized (chilled and cold filtered) to remove any crystalline fractions. A problem with the hydrogenation processes of today is that double bonds in fatty acids can also isomerize to form trans fatty acids during hydrogenation, many of which are rare in nature. Some of these are trans fatty acids. When nickel catalysts are used, saturated and trans fatty acids are produced in high amounts relative to the desired amount of reduction of linolenic acid. This is because nickel catalysts suffer from a lack of optimum selectivity. As a result, the trans fatty acid content of oils hydrogenated with nickel catalysts can be higher than 10%.

Hydrogenation conditions to minimize trans isomer formation while reducing the oxidatively unstable species in edible oil, such as the polyunsaturated acids linolenic and linoleic acid, are currently being studied by many in the industry. Those catalysts currently being examined are generally precious metal based, and hydrogenation is carried out under extremely mild conditions, such as low temperatures. However, to date this has only resulted in a minimal decrease in trans fatty acid content in hydrogenated oils, at the cost of increased saturated fatty acid content and the use of very expensive catalysts.

Precious metal catalysts can be poisoned from various minor components in oils. As a result activity is lost over time and reaction conditions must be continually monitored and altered. These catalysts may be employed in column reactors which require emptying and recharging after the useful catalyst life has ended. The catalyst then must be returned to the catalyst company for credit and regeneration. All of this involves catalyst loss and added cost for column recycling. As precious metal catalysts lose activity and must be recovered, users of precious metal catalysts are often required to purchase a large excess of precious metal to form a "pool" or "kitty" of precious metal, so that the catalyst producer can provide fresh catalyst as needed. As a result, the use of precious metal catalysts is accompanied by a very large capital investment in precious metals.

Selective hydrogenation for producing oils for frying applications using copper chromite catalyst has been known since at least the late 1960's. Vegetable oils have been selectively hydrogenated to decrease the linolenic acid content without increasing the saturated fatty acid content constant and only minimally decreasing the linoleic acid content in soybean oil. The trans content was of no concern in those days as this was prior to the discovery of the detrimental effects of these isomers to human health. Selectively hydrogenating soybean oils produced oil with less than 2% linolenic acid and improved frying stability. However, copper chromite has low catalytic activity and requires very long reaction times. Thus reactor time is measured in hours, not in minutes, adding to increased production costs over comparable nickel catalyzed reactions.

Further, copper chromite suffers from the problem that chromium is one of the components of the catalyst, and thus any plant using this catalyst must handle the recycling and disposal of chromium in a satisfactory manner. First, the catalyst must be recovered from the oil after the hydrogenation reaction by suitable means, such as by centrifugation or filtering. Traces of catalyst remaining in the oil must be removed in a thorough manner, such as filtering through bleaching earth. This removal generates significant quantities of solid waste containing spent copper chromite catalyst and would require shipment to a land fill or to a possible reclamation facility. In addition, the finely powdered catalyst containing chromium could pose a significant health risk to workers operating the processes.

Filtered oil further requires washing with a suitable solution of chelating agent to further recover chromium. This wash water would require passage through expensive ion exchange resin columns to reduce the chromium concentration in the water prior to discharge in order to achieve allowable limits. Further, regulatory permits to allow discharge of trace levels of chromium in waste water must be obtained. In order to measure chromium released to the environment, expensive analytical monitoring equipment and trained operators would be required. Because the use of copper chromite was not attractive for the above reasons, its commercial use as a hydrogenation catalyst is obsolete.

Other copper based catalysts are known in the art. These catalysts have the advantage of being non-chromium. However, they still have the disadvantage of being no faster than copper chromite in reaction time. Furthermore, some were fabricated on a support, generally a molecular sieve, making them somewhat expensive to make. In addition, high hydrogenation temperatures were required (170 to 200° C.). To prepare these catalysts, a support material was slurried in a solution of copper (II) nitrate, and sodium carbonate was added to precipitate copper (II) carbonate onto the support. This preparation was then heated to 350° C. for two hours.

Genetic varieties of soybeans containing oil with low linolenic acid required for frying have just begun to be commercialized. The most recent variety to be commercialized has utilized a traditional genetic breeding program for its development. In general, oils produced from genetic varieties are expensive alternatives to hydrogenated oils.

There is an evident need in the fats and oils industry for an economical catalyst for soybean oil hydrogenation which selectively reduces linolenic acid without generation of significant levels of trans fatty acids or formation of saturated fatty acids.

BRIEF SUMMARY OF THE INVENTION

The copper compositions disclosed herein are useful as hydrogenation catalysts. In particular, the copper compositions are catalysts for the selective hydrogenation of oils that contain unsaturated fatty acyl components. The present invention is also directed to a method of preparing the copper compositions that are useful as hydrogenation catalysts. The present invention is further directed to a method of hydrogenating compositions containing at least two sites of unsaturation. The present invention is also directed to the products obtained from the hydrogenation reactions described herein.

DETAILED DESCRIPTION OF THE INVENTION

In embodiments of the invention, the present invention is directed to processes of hydrogenating a composition containing at least two sites of unsaturation. The processes comprise: a) preparing a mixture by contacting the composition with a hydrogenation catalyst comprising at least one of the following materials: heat-treated copper metal, chemically and optionally heat-treated copper hydroxide, heat or chemically treated copper carbonate/copper hydroxide, and a malachite material; and b) heating the mixture at a temperature from about 50° C. to about 250° C. under a hydrogen atmosphere; where the composition is hydrogenated.

In all aspects of the present invention, the temperature, temperatures or ranges represent the temperature at which the step is conducted. However, the temperature can be more than one temperature in the given range because of fluctuations in temperature during the step.

In an embodiment, the temperature for step b) can be any temperature(s) from about 50° C. to about 250° C. In other embodiments, the temperature is from about 100° C. to about 250° C., or from about 100° C. to about 200° C., or from about 160° C. to about 200° C., or from about 140° C. to about 220° C. Illustratively the temperature is about 160° C., about 180° C., or about 200° C.

The term "hydrogenation" is well-known in the art, and the term "hydrogen atmosphere" is known to mean that the atmosphere in contact with the unsaturated composition comprises hydrogen gas. The pressure of hydrogen includes the range of about 5 psi to about 1000 psi. In embodiments of the invention, the value is from about 20 psi to about 150 psi, or from about 40 psi to about 80 psi.

The time for which the mixture is heated under a hydrogen atmosphere is dependent, inter alia, upon the catalyst of the invention that is used and the desired properties of the resulting hydrogenated composition. For example, the time can range from about 1 minute to about 48 hours (for example, about 30 minutes to about 8 hours, or about 30 minutes to about 4 hours).

Suitable compositions for the present method include any composition containing at least two sites of unsaturation. Such compositions can comprise a single compound or mixtures of compounds wherein at least one compound contains at least two sites of unsaturation. The method described herein is useful for fully hydrogenating or partially hydrogenating the composition. As such, the terms "hydrogenation" or "hydrogenating" as used herein are intended to include partial hydrogenation.

Polyunsaturated fatty acyl compositions comprise compounds and mixtures that contain compounds of the following generic structure:

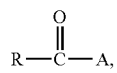

wherein R is a carbon chain from about 2 to about 23 carbons and contains at least two sites of unsaturation; A can be a residue of a monohydric alcohol, a diol, polyol, or glycerol, or a hydroxy, alkoxy or aryloxy moiety. The above general structure includes the following substructure:

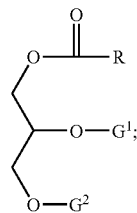

wherein R is as described above, and $G^1$ and $G^2$ are each independently selected from the group consisting of hydrogen and,

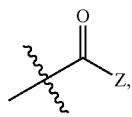

wherein Z represents a carbon chain from about 2 to about 23 carbons in length, optionally having at least two sites of unsaturation. This formula encompasses the fatty acid esters commonly found in vegetable oils and polyunsaturated vegetable oils such as palmitic acid (C16:0); stearic acid (C18:0); oleic acid (C18:1); linoleic acid (C18:2); and linolenic acid (C18:3).

Preferably, the fatty acyl composition containing at least two sites of unsaturation is a vegetable, animal or synthetic fat or oil, or derivatives or mixtures thereof. References made herein to "fatty acids" are intended to mean fatty acids in the form of fatty acid esters in the fatty acyl composition, that is a vegetable, animal or synthetic fat or oil, or derivatives or mixtures thereof, unless the fatty acid is specifically referred to as a "free fatty acid." In this context, it is preferred that the fatty acid or derivative thereof is a triglyceride, diglyceride or monoglyceride or alkyl ester containing a residue of the fatty acid.

References to levels of "fatty acids" in oils refer to the level of fatty acid chains in the form of esters such as glycerides. For example, a fatty acyl containing composition comprising one or more polyunsaturated (i.e. two or more sites of unsaturation) vegetable fatty acid(s) or derivatives or mixtures thereof can include the fatty acids contained in oils in the form of fatty acid esters.

In the generic structure above, when A is a residue of glycerol, then the fatty acyl composition can comprise a triglyceride, diglyceride and/or monoglyceride of a fatty acid (i.e., glycerol alkanoates), and mixtures thereof. Such a diglyceride or triglyceride will have two or three fatty acid chains, respectively, wherein at least one of the chains has at least two sites of unsaturation. More preferred mono-, di- and triglycerides include glycerides of vegetable oil fatty acids. Most preferably, such glycerides are naturally occurring in a vegetable oil starting material.

In this preferred embodiment, the fatty acyl containing composition is an edible oil. Preferred edible oils include vegetable oils. Suitable vegetable oils include but are not limited to: soybean oil, linseed oil, sunflower oil, canola oil, rapeseed oil, cottonseed oil, peanut oil, safflower oil, derivatives and conjugated derivatives of said oils, and mixtures thereof. These oils are known as polyunsaturated vegetable oils. Most preferably, the oil is soybean oil.

The present invention can be used to prepare oils low in linolenic acid and lower in trans fatty acids than partially hydrogenated oils prepared by conventional processes, such as with nickel catalysts. The oils of the invention have good oxidative stability due to the lowered content of linolenic acid.

Illustrative applications for use these oils include, but are not limited to food and beverages, animal feed, technical applications, nutritional supplements, beverages, cosmetics and personal care products, and pharmaceuticals/nutraceuticals.

Illustrative food applications include frying fats and oils, margarine oil, spread oil, bakery fats, frozen dough, cookies with oil, cream cakes (foam cakes), yeast-raised cakes, bread products (bread, buns, rolls), fried bread (with antioxidants), confectionary products, icings, dairy products, cheese products, pasta products, shortening, fat mixtures, emulsions, spray oils, dressings, milk, non dairy protein powders, soups, dressings, meats, gravies, canned meats, meat analogues, bread improvers, beverages, energy drinks, snacks, desserts, ice cream and bars, colors, flavor mixes, emulsifier mixes, baby food, frozen foods fat, spray oil for bakery applications; releasing agent oil for pans, belts, molds, and the like; incorporation into emulsions such as sauces, creams, mayonnaise, toppings, yogurts, microwave popcorn fat, and antioxidants.

Illustrative feed applications include sources of high nutritional value in feed for, for example, fish, shrimp, calves (as milk replacer), pigs, sows, piglets, companion animals, pets, mink, and poultry.

In addition, oils of the invention can be used as a starting material for derived processes and products, such as feedstock for lipid modifications such as fractionation and chemical or enzymatic transesterification or interesterification reactions to prepare useful triacylglycerols, diacylgycerols, monoacylglycerols, esters and waxes. The oils of the invention can also be blended with other oils or fats to provide a blend having desired characteristics.

Derivatives of these oils include genetically modified oils. One desired trait of genetically modified oils is the lower content of linolenic acid compared to natural oils. Some low level varieties have linolenic acid levels as low as about 1.2 to about 1.6%. In natural varieties, the level of linolenic acid is generally about 7-10%. Low linolenic acid varieties can benefit substantially by the hydrogenation method of the present invention especially when the level of linolenic acid is above about 2%, but below the usual amount contained in the corresponding natural variety. The present method will yield a hydrogenated or partially hydrogenated vegetable oil that contains conjugated linolenic acid(s) (CLA), which are not present in the low-level varieties.

When applied to a vegetable oil the present method of hydrogenation advantageously yields a hydrogenated or partially hydrogenated vegetable oil with desirable characteristics for use where liquid oils are needed, such as in foods and food preparation. The present method produces vegetable oils having a linolenic content of no greater than about 5%. The same product will also have a conjugated linolenic acid content of no greater than about 1% and a trans fatty acid content of no greater than about 10%. More preferred vegetable oil products of the present method have a linolenic acid content of no greater than about 3%, and most preferably 1%. These more preferred vegetable oils can also have a trans fatty acid content of no greater than about 8%, and most preferably no greater than about 3% as well as a conjugated linolenic acid content no greater than about 1%.

Copper catalysts of the invention include heat-treated copper metal, chemically and optionally heat-treated copper hydroxide, and heat or chemically treated (e.g., hydrogen peroxide-treated) copper carbonate/copper hydroxide (also referred to as basic copper carbonate) compositions. It has been found that the above copper compounds in their neat condition do not catalyze the hydrogenation described herein to an appreciable degree, if at all, and that these compounds can be made more catalytic by employing the methods of preparing a catalyst described herein. In another embodiment, a hydrogenation catalyst used in the hydrogenation methods of the invention comprises a malachite material (including natural malachite mineral and synthetically prepared malachite (e.g., a precipitated malachite)).

In various embodiments of the invention, the catalysts used in the hydrogenation methods of the invention (e.g., heat-treated copper powder, heat-treated copper carbonate/copper hydroxide, chemically treated copper carbonate/copper hydroxide, chemically treated copper hydroxide, or malachite material) are unsupported catalysts.

A copper metal powder material can be made a useful hydrogenation catalyst when treated as described herein. A representative copper metal powder can be obtained from Umicore Canada (Fort Saskatchewan, Canada). Preferably, these copper powders are high-purity, non-agglomerated, spheroidal products that are also used in electronics applications, such as termination pastes, inner electrode inks, and conductive traces. Four grades of copper powder can be obtained from this manufacturer: UCP 500, UCP 1000, UCP 2000, and UPC 4000. They are characterized by the manufacturer as having the following tap density (grams/cubic centimeter), respectively: 3.6; 3.5; 3.6; and 4.8. In addition, they are characterized by the manufacturer as having the following surface areas (square meters/gram), respectively: 1.0; 0.8; 0.6; and 0.4. and particle sizes (microns), respectively; 0.5; 1.0; 2.0; and 4.0.

In particular, a heat-treated copper metal can be used in the hydrogenation or partial hydrogenation of an unsaturated fatty acyl compound using the process described above. Most preferably, such a material comprises or consists essentially of a heat treated copper metal hydrogenation catalyst having a particle size of about 0.5 microns. The heat treatment for this particular catalyst comprises heating the copper metal powder at a temperature from about 50° C. to about 500° C. More preferably the temperature is from about 150° C. to about 400° C., and most preferably the temperature is from about 200° C. to about 350° C. It is also preferred that the copper powder material is heated in the presence of oxygen. Oxygen may be present during the heat treatment by allowing ambient air or more purified $O_2$ to contact the copper powder material.

This catalyst is prepared by starting with a copper metal powder as described above. This material is then heated as described above, and then the material is preferably subjected to a process that produces a powder of substantially uniform consistency. The term "substantially uniform consistency" means a powder material that is essentially free of agglomerated material or clumps. During the heat treatment, agglomeration or clumping of the copper powder may occur. It has been found that the catalytic activity of the copper metal powder is improved if the agglomerates or clumps are disrupted to form a powder material of substantially uniform consistency. A heat treated copper metal powder hydrogenation catalyst can comprise agglomerates or clumps but it is preferred that the material is essentially free of them.

Any method of disrupting the agglomerates or clumps is envisioned. Preferably, the material is tumbled, deagglomerated, ground, stirred or slurried (with or without grinding) to disrupt the agglomerates or clumps. Preferably, after disrupting the agglomerates or clumps, the material can be heated again as described above and/or the material can then be dried by vacuum, heating or any other drying method known in the art.

A copper metal powder prepared as described above is a useful hydrogenation catalyst especially for producing hydrogenated vegetable oils as food ingredients or for food production. Using the method described herein, such copper metal hydrogenation catalysts preferably yield hydrogenated vegetable oils containing the following ratios of fatty acids: C18:2/C18:0 above about 11.0; C18:2/C18:1 no greater than about 2; C18:3/C18:0 no greater than about 1. The process preferably yields a hydrogenated oil that further comprises a trans fatty acid content of no greater than about 8% depending on the content of linolenic acid in the starting soybean oil.

All fatty acid ratios as described herein were derived by determining the fatty acid profile of starting oils and hydrogenated oil by gas chromatography (GC) according to AOCS methods. Values for C18:0 were reported directly from chromatography, values for C18:1 and C18:2 were obtained by summing the contents of cis and trans isomers of C18:1 and C18:2 fatty acids, respectively. Reactions were monitored by refractive index (RI) and where fatty acid profiles are reported from this data it was obtained by correlating these RI values to published data containing both RI and GC data.

A copper carbonate/copper hydroxide material can be made to be a useful hydrogenation catalyst when treated as described herein. A copper carbonate/copper hydroxide material comprises copper carbonate and copper hydroxide and can be described as basic copper carbonate. Basic copper carbonate is a product of commerce and contains about 50+% copper carbonate, with the remainder consisting essentially of copper hydroxide. A representative material can be obtained from World Metal, LLC (Sugar Land, Tex., USA). The density can range from about 500 to about 2000 kg/cubic meter. The material is basic in character and insoluble in water. As received from the manufacturer, the material can be green in color. However, supplies often vary in shades of color and density (darker green or olive, and heavier, lighter or fluffier) reflecting variations in raw materials and manufacturing procedures. Despite variations in the physical appearance of the material, the amount of contained copper metal remains essentially constant.

A heat or chemically treated copper carbonate/copper hydroxide material can be used in the hydrogenation or partial hydrogenation of an unsaturated fatty acyl compound using the process described above. Such a material comprises or consists essentially of a heat or chemically treated copper carbonate/copper hydroxide hydrogenation catalyst.

The heat treatment for the copper carbonate/copper hydroxide hydrogenation catalyst comprises heating a copper carbonate/copper hydroxide material as described above to a temperature of not less than about 100° C. until the material is black in color, and a hydrogenation catalyst is prepared. In a preferred embodiment, the method of preparing a copper carbonate/copper hydroxide hydrogenation catalyst comprises, a) heating a copper carbonate/copper hydroxide material at a temperature no greater than about 320° C. (e.g., at a temperature from about 100° C. to about 320° C.), and b) heating the material of step a) at a temperature at least about 5° C. higher than the temperature in step a). Thus, in step a) the material is heated and then in step b), the temperature is increased such that the material is then heated at a temperature at least about 5° C. higher than the temperature in step a). At the end of this process, the catalyst will be black in color.

Most preferably, the method comprises three steps, a) heating a copper carbonate/copper hydroxide material at a temperature no greater than about 320° C. for a first period of time, b) disrupting any agglomeration or clumps in the material possibly formed during heating, and c) heating the material of the prior disrupting step at a temperature at least about 5° C. higher than the temperature in step a) for a second period of time.

Preferably, the first period of time is not greater than about 30 minutes, and the second period of time is a period of time sufficient to produce a hydrogenation catalyst. Specifically, the second period of time will be long enough to yield a catalyst that is black in color. This second period of time is preferably from about 1 minute to about 2 hours. More preferably, the second period of time is from about 5 minutes to about 1 hour. Most preferably, the second period of time is from about 10 minutes to about 25 minutes.

In any embodiment, the preparation of this catalyst can also include a step of disrupting agglomerates or clumps during the heating. Methods of disrupting agglomerates and clumps have been described above. After conducting a process of disrupting the agglomerates and clumps, it is preferred that the material has substantially uniform consistency.

It is also preferred that the copper carbonate/copper hydroxide material is heated in the presence of oxygen. Oxygen may be present during the heat treatment by allowing ambient air or more purified $O_2$ to contact the copper powder material.

The copper carbonate/copper hydroxide hydrogenation catalyst as described above is useful for producing hydrogenated vegetable oils as food ingredients or for food production. Using the method described herein, such copper carbonate/copper hydroxide hydrogenation catalysts preferably yield hydrogenated vegetable oils containing the following ratios of fatty acids respectively: Illustrative Oil 1) 18:2/18:0 above about 11.0; 18:2/18:1 no greater than about 2.2; 18:3/18:0 no greater than about 1.7; and Illustrative Oil 2) 18:2/18:0 above about 11.0; 18:2/18:1 no greater than about 2.2; 18:3/18:0 no greater than about 1. The above oils preferably further comprise a trans fatty acid content of no greater than about 8%.

In another embodiment of the invention, a catalyst comprising a chemically treated copper carbonate/copper hydroxide material can be used in hydrogenation or partial hydrogenation using the process described above. By the term "chemically treated copper carbonate/copper hydroxide material," it is meant that the copper carbonate/copper hydroxide material is contacted with a reagent to improve its ability to catalyze a hydrogenation reaction.

In an embodiment, the copper carbonate/copper hydroxide material is chemically treated with a hydrogen peroxide solution. Thus, in this embodiment, a chemically treated copper carbonate/copper hydroxide is prepared by a) preparing a mixture by contacting copper carbonate/copper hydroxide material with a hydrogen peroxide solution, wherein said mixture is maintained at temperatures from about −5° C. to about 100° C.; and b) separating a solid material from said mixture; wherein a hydrogen peroxide treated copper carbonate/copper hydroxide hydrogenation catalyst is prepared.

The hydrogen peroxide can be in the form of an aqueous solution. Concentrations of aqueous hydrogen peroxide can range from about 1% to about 90% hydrogen peroxide. In embodiments of the invention, the concentration is from about 40% to about 60%, or from about 45% to about 55%. In yet another embodiment, the concentration is about 50% as supplied commercially.

As mentioned above, the mixture is maintained at temperatures from about −5° C. to about 100° C. In an embodiment, the mixture is maintained at temperatures from about −5° C. to about 30° C.

The preparation of this catalyst can also include disrupting agglomerates or clumps in the material. Agglomerates or clumps in the material can be disrupted before and/or after the solid material is separated from the mixture (step b, above). Methods of disrupting agglomerates and clumps are described above. In embodiments of the invention, agglomerates or clumps in the material are disrupted by grinding, preferably by slurry grinding in an appropriate liquid. For example, the material can be slurry ground in hydrogen peroxide, which can be the same or different from, and at the same or different concentration of, the hydrogen peroxide used in step a). After slurry grinding, the material can be separated from the liquid phase by any method known in the art such as filtering (e.g. vacuum filtering), decanting, centrifuging, or any combination thereof. Optionally, the material can then be dried by vacuum, heating or other drying method known in the art.

In an embodiment, the hydrogen peroxide-treated copper carbonate/copper hydroxide hydrogenation catalyst may be subjected to one or more additional chemical treatments with a hydrogen peroxide solution. The hydrogen peroxide-treated copper carbonate/copper hydroxide hydrogenation catalyst may be subjected to any of rinsing, filtering or drying prior to being subjected to one or more additional chemical treatments with a hydrogen peroxide solution.

The copper carbonate/copper hydroxide hydrogenation catalyst as described above is useful for producing hydrogenated vegetable oils as food ingredients or for food production. Using the method described herein, such copper carbonate/copper hydroxide hydrogenation catalysts preferably yield hydrogenated vegetable oils containing the following ratios of fatty acids: Illustrative Oil 1) C18:2/C18:0 above about 11.0; C18:2/C18:1 no greater than about 2.2; C18:3/C18:0 no greater than about 1.7; Illustrative Oil 2) C18:2/C18:0 above about 12.0; C18:2/C18:1 no greater than about 2.1; C18:3/C18:0 no greater than about 1.6; Illustrative Oil 3) C18:2/C18:0 above about 12.2; C18:2/C18:1 no greater than about 2.0; C18:3/C18:0 no greater than about 1.4; and Illustrative Oil 4) C18:2/C18:0 above about 11.3; C18:2/C18:1 no greater than about 1.65; C18:3/C18:0 no greater than about 0.65. The above oils preferably further comprise a trans fatty acid content of no greater than about 8%.

In another embodiment of the invention, a catalyst comprising or consisting essentially of a chemically treated copper hydroxide material can be used in hydrogenation or partial hydrogenation using the process described above. By the term "chemically treated copper hydroxide material," it is meant that the copper hydroxide material is contacted with a reagent to improve its ability to catalyze a hydrogenation reaction.

In an embodiment, the copper hydroxide material is chemically treated with a hydrogen peroxide solution. Thus, in this embodiment, the chemical treatment of a material comprising or consisting essentially of a copper hydroxide material comprises, a) preparing a mixture by contacting a copper hydroxide material with a hydrogen peroxide solution, wherein said mixture is maintained at temperatures from about −5° C. to about 100° C.; and b) separating a solid comprising said catalyst, wherein a hydrogen peroxide treated copper hydroxide hydrogenation catalyst is prepared.

The hydrogen peroxide can be in the form of an aqueous solution. Concentrations of aqueous hydrogen peroxide can range from about 1% to about 90% hydrogen peroxide. In embodiments of the invention, the concentration is from about 40% to about 60%, or about 45% to about 55%. In yet another embodiment, the concentration is about 50% as supplied commercially.

The temperature(s) in step a) are preferably from about 0° C. to about 100° C. The material can be separated from the liquid phase by any method known in the art such as filtering (e.g. vacuum filtering), decanting, centrifuging, or any combination thereof. Optionally, the material can then be dried by vacuum, heating or other drying method known in the art.

The copper hydroxide hydrogenation catalyst can also be prepared by contacting with hydrogen peroxide as described herein, followed by separating from the hydrogen peroxide by the methods described herein, drying by any known method in the art, and subsequently being heated in an oil at a temperature above about 50° C. Preferably, the temperature is from about 100° C. to about 250° C. The oil can be any oil, but preferably the oil is an edible oil such as a vegetable oil. The copper hydroxide hydrogenation catalyst can be separated from the oil if, for example, the oil in this step is not a composition to be hydrogenated, and used to hydrogenate a composition comprising at least two sites of unsaturation. Preferably, the catalyst is heated until the color of the catalyst is black.

The chemically treated copper hydroxide hydrogenation catalyst as described above is useful for producing hydrogenated vegetable oils as food ingredients or for food production. Using the method described herein, such copper hydroxide hydrogenation catalysts preferably yield hydrogenated vegetable oils containing the following ratios of fatty acids: Illustrative Oil 1) C18:2/C18:0 above about 11.0; C18:2/C18:1 no greater than about 1.8; C18:3/C18:0 no greater than about 1.0; Illustrative Oil 2) C18:2/C18:0 above about 11.5; C18:2/C18:1 no greater than about 1.7; C18:3/C18:0 no greater than about 0.55; and Illustrative Oil 3) C18:2/C18:0 above about 11.7; C18:2/C18:1 no greater than about 1.69; C18:3/C18:0 no greater than about 0.53. The above oils preferably further comprise a trans fatty acid content of no greater than about 10%. More preferably, the above oils further comprise a trans fatty acid content of no greater than about 8%.

A hydrogenation catalyst comprising a malachite material can also be used in the hydrogenation or partial hydrogenation of an unsaturated fatty acyl compound using the process described above. By "malachite material," it is meant a synthetic or natural material containing malachite. Malachite (also referred to in scientific literature as copper (II) carbonate hydroxide, $Cu_2CO_3(OH)_2$, basic copper carbonate, or copper carbonate/copper hydroxide) has CAS Registry Number 1319-53-5 with the following structure:

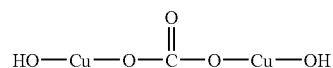

In an embodiment of the invention, the malachite material is naturally occurring malachite mineral. Natural malachite can be found in the oxidations zone of polymetallic deposits in ore fields, and appear as radiate-fibrous, spheroidal, and sintered aggregates with shell-like cleavage, silky luster, and a characteristic green color in varicolored band due to diverse grain sizes. Natural malachite can be purchased in clumps from rock collectors, and may contain trace amounts of phosphorus, calcium, strontium, zinc and manganese.

In another embodiment of the invention, the malachite material is synthetically prepared malachite. The synthetically prepared malachite can be prepared by any suitable method. For example, the synthetically prepared malachite is a precipitated malachite, i.e., malachite prepared by a precipitation method, such as by precipitation of copper cations and carbonate anions. A suitable method of preparation of precipitated malachite is disclosed in H. Parekh and A. Hsu, "Preparation of synthetic malachite. Reaction between cupric sulfate and sodium carbonate solutions," *Industrial & Engineering Chemistry Product Research and Development* 7(3): 222-6 (1968). Examples of the preparation of precipitated malachite are described in Example 9, below.

In an embodiment, the hydrogenation catalyst comprising a malachite material (e.g. as a naturally occurring mineral or synthetically prepared by precipitation) is unsupported. That is, an unsupported catalyst comprising a malachite material according to the present invention can be used for hydrogenation of an unsaturated composition, and particularly for a composition containing at least two sites of unsaturation.

In embodiments of the invention, the malachite material can be chemically treated, i.e. contacted with a reagent to improve its ability to catalyze a hydrogenation reaction. In an embodiment, the malachite material is chemically treated by contacting it with a hydrogen peroxide solution. For example, the malachite material can be chemically treated by a) contacting the malachite material with a hydrogen peroxide solution to form a mixture, and maintaining the mixture at about −5° C. to about 100° C. and b) separating the treated material from the mixture. The conditions for preparing the chemically treated malachite (e.g., concentration of reagent(s), temperature, and separation technique(s)) include those discussed for the chemically treated copper carbonate/copper hydroxide catalyst, above.

A hydrogenation catalyst comprising a malachite material as described above is useful for producing hydrogenated vegetable oils as food ingredients or for food production. Such malachite material hydrogenation catalysts (and particularly the unsupported synthetic precipitated malachite catalyst) preferably yield hydrogenated vegetable oils containing the following ratios of fatty acids: C18:2/C18:0 above about 10; C18:2/C18:1 no greater than about 1.76; C18:3/C18:0 no greater than about 0.61. In embodiments, the above hydrogenated oils further comprise a trans fatty acid content of no greater than about 8%.

Any of the catalysts of the present invention (i.e., heat-treated copper metal, chemically and optionally heat-treated copper hydroxide, heat or chemically treated copper carbonate/copper hydroxide, and a malachite material) can be further treated prior to use in a hydrogenation reaction in order to improve its ability to catalyze a hydrogenation reaction. The catalysts are further treated by heating the catalysts in an oil in the presence or absence of additional hydrogen. The further treated catalysts are then recovered from the oil and can be used to catalyze hydrogenation reactions as disclosed herein.

The oil that can be used in the further treatment of the catalysts of the invention is not particularly limited, and can include any vegetable oil, animal oil, butterfat, cocoa butter, cocoa butter substitutes, illipe fat, kokum butter, milk fat, mowrah fat, phulwara butter, sal fat, shea fat, borneo tallow, lard, lanolin, beef tallow, mutton tallow, tallow, animal fat, canola oil, castor oil, coconut oil, coriander oil, corn oil, cottonseed oil, hazelnut oil, hempseed oil, jatropha oil, linseed oil, mango kernel oil, meadowfoam oil, mustard oil, neat's foot oil, olive oil, palm oil, palm kernel oil, peanut oil, rapeseed oil, rice bran oil, safflower oil, sasanqua oil, shea butter, soybean oil, sunflower seed oil, tall oil, tsubaki oil, tung oil, marine oils, menhaden oil, candlefish oil, cod-liver oil, orange roughy oil, pile herd oil, sardine oil, whale oils, herring oils, triglyceride, diglyceride, monoglyceride, triolein palm olein, palm stearin, palm kernel olein, palm kernel stearin, triglycerides of medium chain fatty acids, and derivatives, conjugated derivatives, genetically-modified derivatives and mixtures thereof.

The temperature and time for which the catalyst/oil mixture is heated to further treat the catalyst is not particularly limited. In embodiments of the invention, the temperature is from about 100° C. to about 200° C., and the time ranges from about 1 minute to about 120 minutes, typically about 15 minutes The further treated catalysts of the invention are expected to provide a lowered linolenic acid content and/or lowered trans fatty acid formation in a hydrogenation reaction compared to catalysts that are not further treated. Further treatment of a copper hydroxide catalyst and the results of hydrogenation using that catalyst is illustrated in Example 7, below.

The catalysts of the present invention can be reused or recycled. Thus, the catalysts described herein can be used to hydrogenate or partially hydrogenate subsequent compositions comprising at least two sites of unsaturation. In one example of this embodiment, following the step of heating a mixture comprising a catalyst and a composition comprising at least two sites of unsaturation under a hydrogen atmosphere, the solid material is separated from the mixture.

Separation of the solid material from a hydrogenated oil can be performed by any means, such as those described above for separating a solid from a non-solid material, and at any convenient processing temperature. Suitable methods include centrifugation, settling, decantation, filtration (e.g., vacuum filtration), contact with a filter aid, contact with a liquid or solid chelating agent, addition of an activated adsorbent, or any combination thereof. For example, vacuum filtration can be carried out using filter aids, such as Celite 503 Diatomaceous Earth (World Minerals Inc., Goleta, Calif.). Other separation methods include contact with a liquid or solid chelating agent such as citric acid solution, by addition of activated adsorbent such as activated SorbsilR92 (INEOS Silicas Americas, LLC, Joliet, Ill.), and filtering through a filter aid.

Subsequent to separation, the solid material can be contacted with a composition containing at least two sites of unsaturation to form a mixture, and this will then be heated at a temperature from about 50° C. to about 250° C. under a hydrogen atmosphere wherein said composition is hydrogenated. This process can be repeated such that the solid material comprising the hydrogenation catalyst is contacted with subsequent compositions containing at least two sites of unsaturation and then separated from the hydrogenated compositions, wherein the hydrogenated compositions will have been hydrogenated using the methods described herein.

EXAMPLES

Example 1

Hydrogenation Using Neat Powders

Neat powders as received from various chemical supply companies were tested as hydrogenation catalysts without any pretreatment.

Hydrogenation reaction: Soybean oil (Linolenic acid 7.1%, trans fatty acid 0.2%, Conjugated linoleic acid 0.1%) was dewatered under vacuum (ca. 0.5-2 torr) at 80-85° C.; 600 grams of dewatered soybean oil were charged into a 2 liter pressure reactor (Parr Model 4542). Catalyst (nominally 0.1% copper as a percentage of oil used in a given reaction) was added, and the vessel was sealed. The reaction mixture was heated to 160° C. under a hydrogen atmosphere of 60 psi with a slight hydrogen gas purge through a fritted disk in the bottom of the vessel. The results are given below in Table 1:

TABLE 1

| Catalyst | Reaction time | Final Linolenic acid content (%) | Final trans fatty acid content (%) | Final CLA* content (%) |
|---|---|---|---|---|
| $Cu(OAc)_2$ | No Reaction | | | |
| $Cu(NO_3)_2$ | No Reaction | | | |
| $CuCl_2$ | No Reaction | | | |
| CuS | No Reaction | | | |
| $CuSO_4$ | No Reaction | | | |
| CuO | No Reaction | | | |
| $Cu(OH)_2$ | 5 hours | 5.8 | No Data | No Data |

*CLA: Conjugated Linoleic Acid

Copper compounds as received are shown to be ineffective hydrogenation catalysts under the conditions described.

Example 2

Reference Hydrogenation Using Copper Chromite

A commercially available copper chromite catalyst (G22/2 in powder form from Sud Chemie Inc.) was used without modification. The hydrogenation reaction was identical to Example 1. The results given below in Table 2 show that this catalyst produced desirable levels of linolenic acid with low trans fat content and about 1% formation of CLA:

TABLE 2

| Catalyst | Reaction time | Final Linolenic acid content (%) | Final trans fatty acid content (%) | Final CLA* content (%) |
|---|---|---|---|---|
| Copper chromite | 5 hours | 1.74 | 7.45 | 0.96 |

Example 3

Hydrogenation Using Copper Powder

Hydrogenation reactions using commercially available copper powder (Umicore Canada Inc., product # UCP 500, particle size: 5 microns) were carried out. The results are given in Table 3 below.

No treatment: UPC 500 (12.1 grams) was added without treatment to 598 grams of dry refined and bleached soybean oil. Hydrogenation conditions were as in Example 1.

Treatment 1: UPC 500 (12.0 grams) was heated in a muffle furnace at 300° C. for several 4-5 minute intervals. After the third interval, the material was subjected to disrupting the agglomerates or clumps. The hydrogenation was carried out as in Example 1.

TABLE 3

| Copper powder | Reaction time (hr) | C18:0 (%) | C18:1 (%) | C18:2 (%) | Final linolenic acid content (%) | Trans (%) |
|---|---|---|---|---|---|---|
| Soybean oil | | 4.3 | 22.0 | 52.9 | 7.2 | 0.2 |
| No treatment | 7 | 4.3 | 24.3 | 51.7 | 7.0* | 0.6 |
| Treatment 1 | 5 | 4.3 | 31.4 | 49.2 | 2.4 | 7.8 |

*linolenic acid content estimated from RI (refractive index)

Copper powder as received ("No treatment" in Table 3) was ineffective under hydrogenation conditions, and raised the content of undesirable trans fatty acids without decreasing the linolenic acid level significantly. After heat treatment including disrupting any agglomerates and clumps, the catalyst produced an oil with a decrease of C18:3 with a reasonable increase in trans fatty acids. As shown in Table 3, the level of C18:1 increased, and the level of C18:0 was unchanged.

Example 4

Heat-Treated or Hydrogen Peroxide-Treated Copper Carbonate/Copper Hydroxide Hydrogenation reactions using commercially available copper carbonate/copper hydroxide (basic copper carbonate, CUCOCER, obtained from World Metals, Inc. and Sigma Aldrich basic copper carbonate) were carried out. The results are given in Tables 4.1 and 4.2 below.

No treatment: CUCOCER and Sigma Aldrich basic copper carbonate (6 grams) were used as received.

Vacuum dried: CUCOCER was vacuum dried overnight at 350° F. (177° C.) or 500° F. (260° C.) for 1 hour at 20 mm Hg.

Heat Treatment:

Treatment 1a: CUCOCER (1.05 grams) was briefly treated at 360° C. in a muffle furnace until the color turned to avocado green. The hydrogenation reaction was carried out as in Example 1 using the entire amount as catalyst.

Treatment 1b: CUCOCER (1.05 grams) was treated at 360° C. in a muffle furnace until the color turned darker than treatment 1a, to greenish brown (olive drab). The hydrogenation reaction was carried out as in Example 1 using the entire amount as catalyst.

Treatment 1c: CUCOCER (1.05 grams) was heated in a muffle furnace at 300° C. for ten minutes, followed by 350° C. for about 10 minutes. The catalyst color was black after this treatment. The hydrogenation reaction was carried out as in Example 1 using the entire amount as catalyst.

Treatment 1d: Sigma-Aldrich basic copper carbonate (25.0 grams) was heated at 350° C. for four minute intervals, removed from the oven and swirled briefly to mix, then returned to the muffle furnace for four minutes of additional heating. When removed from the furnace the material had it turned black. The hydrogenation reaction was carried out as in Example 1 using the entire 25 grams as catalyst.

TABLE 4.1

| Basic copper carbonate | Reaction time | C18:0 (%) | C18:1 (%) | C18:2 (%) | Final Linolenic acid content (%) | Trans fatty acid content (%) |
|---|---|---|---|---|---|---|
| No treatment CUCOCER and Sigma Aldrich | 5 hours | | | | No reaction | |
| Vacuum Dried CUCOCER | 4 hours | | | | No reaction | |
| Treatment 1a | 5 hours | | | | No reaction | |
| Treatment 1b | 5 hours | 4.2 | 24.6 | 51.8 | 6.9 | 1.3 |
| Treatment 1c | 5 hours | 4.3 | 31.7 | 48.8 | 2.5 | 8.6 |
| Treatment 1d Sigma Aldrich | 2 hours | | | | No reaction | |

The results above show that copper carbonate/copper hydroxide as received was ineffective as a hydrogenation catalyst. When CUCOCER was heated at 350° C. so that the powder turned black (Treatment 1c), an excellent hydrogenation catalyst was obtained by this process. Oil hydrogenated with this catalyst had diminished content of linolenic acid and C18:2. Additionally, the content of C18:1 increased without any noticeable change in C18:0.

Hydrogen Peroxide Treatment:

When CUCOCER was contacted with hydrogen peroxide it darkened to a brown color but did not turn black as when heated at 350° C.

Treatment 2a: CUCOCER (4.0 grams) was slurried with 10 ml of 5% hydrogen peroxide for a few minutes. Heat was generated during the treatment, and the CUCOCER turned an avocado green color during treatment. The treatment reaction was terminated by filtering treated CUCOCER through a buchner funnel followed by washing with deionized water. The chemically treated CUCOCER was dried in a vacuum desiccator. The hydrogenation reaction was carried out as in Example 1 using 1.05 g catalyst.

Treatment 2b: CUCOCER (5.4 grams) was slurried with 10 ml of 5% hydrogen peroxide for a few minutes. Heat was generated during the treatment, and the CUCOCER turned a dark avocado green color during treatment. The treatment reaction was terminated by filtering treated CUCOCER through a buchner funnel followed by washing with deionized water. The chemically treated CUCOCER was dried in a vacuum desiccator. The hydrogenation reaction was carried out as in Example 1 using 1.05 g catalyst.

Treatment 2c: Sigma Aldrich basic copper carbonate (24.4 grams) was slurried in 60 ml water. Aliquots (10-15 ml) of a 5% solution of hydrogen peroxide totaling 40 ml were added to the slurry and the slurry was allowed to incubate for 60 minutes. The slurry was filtered through a buchner funnel and washed with deionized water, then dried at room temperature overnight in a vacuum desiccator. The hydrogenation reaction was carried out as in Example 1 using 1.05 g catalyst.

Treatment 2d: Sigma-Aldrich basic copper carbonate (20.0 grams) was slurried in water with a total of 10 ml of 50% $H_2O_2$ added in 2 ml aliquots while the slurry was held in an ice bath. The product was filtered, washed and dried in a desiccator as in treatment 2c. The reaction was carried out as in Example 1 using 1.05 g catalyst except that the reaction was run at 200° C.

Treatment 2e: Treated Sigma-Aldrich-basic copper carbonate from Treatment 2d (~6 grams) was further treated by placing it in a mortar and slurry grinding with 2 ml of 50% $H_2O_2$; this was allowed to be contacted for 30 minutes while stirring. The catalyst was filtered and dried in a vacuum desiccator. Hydrogenation was carried out as in Treatment 2d using 1.05 g catalyst.

TABLE 4.2

| Basic copper carbonate | Reaction time | C18:0 (%) | C18:1 (%) | C18:2 (%) | Final Linolenic acid content (%) | Trans fatty acid content (%) |
|---|---|---|---|---|---|---|
| Treatment 2a CUCOCER | 5 hours | 4.3 | 25.3 | 51.6 | 6.6 | 1.9 |
| Treatment 2b* CUCOCER | 7 hours | 4.3 | 26.4 | 51.8 | 4.3 | 3.6 |
| Treatment 2c* Sigma Aldrich | 6 hours | 4.2 | 25.7 | 51.4 | 5.5 | 2.5 |
| Treatment 2d Sigma-Aldrich | 3 hours | 4.3 | 31.3 | 48.6 | 2.8 | 8.1 |
| Treatment 2e Sigma-Aldrich | 45 min. | 4.3 | 30.0 | 49.4 | 2.8 | 6.5 |

*Fatty acids estimated from RI

CUCOCER prepared by Treatment 2a was catalytically active. CUCOCER treated to a darker color in Treatment 2b was even more active. The latter yielded a desirable reduction in linolenic acid without substantially changing the other fatty acid levels. Hydrogen peroxide treatments were very effective with Sigma Aldrich basic copper carbonate. Treatment 2c, produced an active catalyst; however, treatment 2d produced a more active catalyst. Activity was increased even further in Treatment 2e. The resulting catalyst produced desirable linolenic acid decrease and increased C18:1 content in a very short reaction time (45 minutes).

Example 5

Hydrogenation Using $H_2O_2$-Treated Copper Hydroxide

Hydrogenation reactions using commercially available copper hydroxide (CUHSULC from World Metals, Inc., also called copper (II) hydroxide) were carried out. The results are given in Table 5 below.

Hydrogen Peroxide Treatment:

Treatment 2a: CUHSULC (4.5 grams) was slurried in 10 ml of a 50% solution of hydrogen peroxide. The slurry was filtered on a Buchner funnel, washed with water and allowed to dry for 48 hours in a vacuum dissicator. This catalyst (0.96 grams) was added to 600 g oil and the hydrogenation reaction was carried out as in Example 1.

Treatment 2b: CUHSULC (5.0 g) was slurried in an ice bath in 10 ml of a 50% solution of hydrogen peroxide, followed by addition of 5 ml of 50% hydrogen peroxide. The slurry was filtered on a Buchner funnel, washed with water and allowed to dry for 48 hours in a vacuum dissicator to form an olive drab colored powder. 1.05 Grams of this CUHSULC catalyst was added to 600 grams of RB soy oil (dry) and the hydrogenation reaction was carried out as in Example 1.

Treatment 2c: CUHSULC (5.43 grams) was treated with 10 ml 50% $H_2O_2$ added dropwise over an ice bath and dried in a vacuum desiccator. The hydrogenation was done as in Example 1 using 1.05 g catalyst.

Treatment 2d: CUHSULC (10.205 g) was slurried in 25 ml water, treated with 10 ml 50% $H_2O_2$ added dropwise over an ice bath and dried in a vacuum desiccator. The hydrogenation was done as in Example 1 using 1.05 g catalyst.

peroxide was added dropwise to the slurry in an ice bath. The treated slurry was then filtered, washed and dried in a vacuum desiccator. The hydrogenation was run using 2.108 grams of catalyst according to Example 1. The RI of the oil was 1.46151 after 15 minutes and 1.46140 at 30 minutes.

Second use: the catalyst was recovered by centrifuging the reaction mixture at 9000 rpm for 15 minutes. No visible catalyst remained in the oil. The oil was decanted off and fresh oil was added and used to transfer the catalyst to the reaction vessel in slurry form with minimal catalyst loss. A total of 600 grams of oil was used for this reaction and run as in Example 1. The RI after 15 minutes was 1.46131 and after 30 minutes was 1.46121, indicating a much faster initial hydrogenation than in the first use. This example demonstrated that the catalyst is recoverable and reusable with no observable loss of activity on the first reuse. The RI at one hour was 1.46112.

Third use: The catalyst was recovered again as for the second use and reused with 600 g dry RB soy oil as in Example 1. The reaction was a trace slower than the first reuse, but was still faster than the initial reaction. The RI after 30 minutes was 1.46132 (which was faster than the original run, 1.46140) and 1.46121 after one hour.

Fourth use: the catalyst from the third use was recovered as in the second and third uses and reused a fourth time with 600 grams of dry RB soy oil as in Example 1. The RI after 30 minutes was 1.46134 and 1.46123 after one hour. The time to reach 2.5% linolenic acid for this reaction was 2 hours. The results are given in Table 6 below.

TABLE 6

| Use | Time to attain ~2.5% linolenic acid | Linolenic acid (%) | Trans (%) |
| --- | --- | --- | --- |
| 1st | 1 Hour | 2.2 | 7.3 |
| 2nd | 1 Hour+ | 2.6 | 7.9 |
| 3rd | 1 Hour+ | 2.4 | 8.8 |
| 4th | 2 Hours | 2.4 | 9.07 |

TABLE 5

| Copper hydroxide treatment | Reaction time | C18:0 (%) | C18:1 (%) | C18:2 (%) | Final linolenic acid content (%) | Final trans fatty acid content (%) | Final CLA content (%) |
| --- | --- | --- | --- | --- | --- | --- | --- |
| None | 5 hours | | | | No reaction | | |
| 2a | 2 hours | 4.3 | 30.5 | 51.0 | 1.9 | ~7.5 | 0.7 |
| 2b | 2 hours | 4.2 | 32.2 | 49.0 | 1.69 | 9.1 | 0.6 |
| 2c | 2 hours | 4.3 | 29.9 | 50.4 | 2.3 | 7.3 | 0.8 |
| 2d | 1 hour | 4.3 | 29.9 | 50.0 | 2.2 | 7.3 | 0.8 |

Copper (II) hydroxide catalyst prepared by all variations of treatment 2 were extremely effective hydrogenation catalysts and rapidly produced an oil with desirable levels of linolenic acid with low trans fat content and little formation of CLA.

Example 6

Reuse of Copper Hydroxide Catalyst

CUHSULC (10.21 grams) was treated by first adding 25 ml of $H_2O$ to effect a slurry, after which 10 ml 50% hydrogen Example 7

Combined Treatments of Copper Hydroxide Catalyst

Copper hydroxide (5 g) was slurried in 10 ml of a 5% solution of hydrogen peroxide, followed by addition of 5 ml of 50% hydrogen peroxide to the slurry in an ice bath. The slurry was filtered on a Buchner funnel, washed with water and allowed to dry for 48 hours in a vacuum dissicator to form an olive drab colored powder. A control reaction was run as in Example 1 with 1.05 grams of this catalyst. The rest of the copper hydroxide hydrogenation catalyst was added to 30 ml soybean oil and heated to 160-170° C. with stirring until the catalyst turned black (about 15 minutes at temperature). The catalyst was recovered by filtration and used to catalyze hydrogenation reactions as in example 1 using 1.05 g catalyst at 160° and 180° C. The results are given in Table 7 below.

TABLE 7

| Copper hydroxide treatment | Reaction time | C18:0 (%) | C18:1 (%) | C18:2 (%) | Final linolenic acid content (%) | Final trans fatty acid content (%) |
|---|---|---|---|---|---|---|
| Control 160° C. | 2 | 4.3 | 29.9 | 48.6 | 2.3 | 7.3 |
| 160° C. | 2 | 4.3 | 30.7 | 50.03 | 1.9 | 8.2 |
| 180° C. | 1.5 | 4.3 | 29.3 | 50.3 | 2.6 | 6.6 |

The combination of hydrogen peroxide treatment and heating in oil in the absence of additional hydrogen provided a hydrogen peroxide-treated copper hydroxide hydrogenation catalyst with excellent reduction in linolenic acid content at short reaction times with little formation of trans fatty acids.

Example 8

Hydrogenation Using Mineral Malachite

A sample of mineral malachite from Congo, Africa was obtained from a rock collector. The mineral malachite was ground in a hand mortar in the laboratory. After grinding the particle size distribution was: Less than 10 microns, 2.1%; between 10 and 20 microns, 13.3%; greater than 20 microns, 65.5%. The ground mineral malachite was used at 0.1% (wt. copper/wt. oil) to hydrogenate dried refined, bleached, deodorized soybean oil at 165° C. at 60 psig hydrogen for 4 hours. The resulting oil contained 5.39% C18:0, 37.82% C18:1, 41.48% C18:2, 2.92% C18:3 and 16.23% trans fatty acids.

Example 9

Hydrogenation Using Precipitated Unsupported Malachite

Precipitated malachite was prepared by the following procedures, below and used to catalyze hydrogenation reactions, as provided below.
Procedure 1: Unsupported precipitated malachite was prepared in accordance with the description in H. Parekh and A. Hsu, "The Preparation of Malachite. Reaction between cupric sulfate and sodium carbonate solutions." Industrial & Engineering Chemistry Product Research and Development (1968), 7 (3), 222-6. Commercially available basic copper carbonate (20.04 grams, World Metal LLC, Sugar Land, Tex.) was slurried in 140 ml water, and 10.2 ml concentrated sulfuric acid was added to make a solution of dissolved copper sulfate. Anhydrous sodium carbonate (24 grams) was dissolved in 600 ml of water.
The dissolved copper sulfate solution was added to the sodium carbonate solution over a five minute period as the sodium carbonate solution was stirred on a stirring plate. A precipitate formed and was allowed to settle. About 450 ml of the liquid layer was removed by decanting and another 200 ml was removed by siphoning. The precipitate was rinsed with three times with water (400 ml) to obtain a light green precipitate of malachite, which was vacuum filtered in a buchner funnel. The precipitated malachite was then placed in a vacuum oven at 150° C. overnight to dry.

The dried precipitated malachite was then used as an unsupported catalyst without further treatment to catalyze hydrogenation reactions of refined, bleached, deodorized oil as in example 1 using 1.04 grams of catalyst. The results are given in Table 8 below (two different reaction conditions are illustrated).

Procedure 2: Unsupported precipitated malachite was prepared in accordance with the description in H. Parekh and A. Hsu, "The Preparation of Malachite. Reaction between cupric sulfate and sodium carbonate solutions." Industrial & Engineering Chemistry Product Research and Development (1968), 7 (3), 222-6. Commercially available basic copper carbonate (10.15 grams, World Metal LLC, Sugar Land, Tex.) was slurried in 50 ml water, and 6.6 ml concentrated sulfuric acid was added to make a solution of dissolved copper sulfate. An additional 20 ml of $H_2O$ was added to resolubilize some of the $CuSO_4$ which had precipitated out of the saturated solution. Anhydrous sodium carbonate (12 grams) was dissolved in 200 ml of water.

Two-thirds of the dissolved copper sulfate solution was added dropwise to the sodium carbonate solution as the sodium carbonate solution was stirred on a stirring plate; the final one-third was poured in slowly and caused significant effervescing. A precipitate formed and was allowed to settle. Part of the liquid layer was removed by decanting and part of the liquid layer was removed by siphoning. The precipitate was rinsed with three times with water to obtain a light green precipitate of malachite, which was vacuum filtered in a buchner funnel. The precipitated malachite was then placed in a vacuum oven at 150° C. overnight to dry.

The dried precipitated malachite was then used as an unsupported catalyst without further treatment to catalyze hydrogenation reactions of refined, bleached, deodorized oil as in example 1 using 1.04 grams of catalyst. The results are given in Table 8 below.

Procedure 3: Unsupported precipitated malachite was prepared in accordance with the description in H. Parekh and A. Hsu, "The Preparation of Malachite. Reaction between cupric sulfate and sodium carbonate solutions." Industrial & Engineering Chemistry Product Research and Development (1968), 7 (3), 222-6. Commercially available basic copper carbonate (20.04 grams, World Metal LLC, Sugar Land, Tex.) was slurried in 140 ml water, and 10.2 ml concentrated $H_2SO_4$ was added to make a solution of dissolved copper sulfate. Anhydrous sodium carbonate (24 grams) was dissolved in 600 ml of water.

Both solutions were heated to 60° C., and the dissolved copper sulfate solution was added to the sodium carbonate solution over a five minute period as the sodium carbonate solution was stirred on a stirring hot plate. A precipitate formed and was allowed to settle. About 450 ml of the liquid layer was removed by decanting and another 200 ml was removed by siphoning. The precipitate was rinsed with three times with water (400 ml) to obtain a light green precipitate of malachite, which was vacuum filtered in a buchner funnel. The precipitated malachite was then placed in a vacuum oven at 150° C. overnight to dry.

The dried precipitated malachite was then used as an unsupported catalyst without further treatment to catalyze hydrogenation reactions of refined, bleached, deodorized oil as in example 1 using 1.04 grams of catalyst. The results are given in Table 8 below.

Procedure 4: Unsupported precipitated malachite catalyst prepared by procedure 1 was further treated with hydrogen peroxide as follows: Unsupported precipitated malachite catalyst (1 gram) was slurried in water over ice, and 50% hydrogen peroxide (1 ml.) was added dropwise over a 30 minute period. The slurry was allowed to warm to room temperature, then and vacuum filtered in a buchner funnel to provide a chemically treated precipitated malachite catalyst. The chemically treated precipitated malachite catalyst was then placed in a vacuum oven at 150° C. overnight to dry, then used to catalyze hydrogenation reactions of refined, bleached, deodorized oil as in example 1 using 1.04 grams of catalyst. The results are given in Table 8 below.

Commercial basic copper carbonate: Commercial basic copper carbonate previously purchased from Mallinckrodt Laboratory Chemicals (Phillipsburg, N.J.) was tested as a catalyst without further treatment to catalyze hydrogenation reactions of refined, bleached, deodorized oil as in Example 1 using 0.504 grams of catalyst. The results are given in Table 8 below.

about 30 minutes. The mixture was again vacuum filtered through a bed of Celite 503 as described above to obtain treated oil free from copper (detection limit: 0.1 mg/kg).

Example 10

Ratios of Fatty Acids

Ratios of fatty acids in a) starting soybean oil, and b) oil obtained after hydrogenating soybean oil according to the methods above (referenced below by Table No.) were calculated and are given below in Table 9.

TABLE 9

| Description | # | C18:2/C18:0 | C18:2C/18:1 | Linolenic/C18:0 |
|---|---|---|---|---|
| Starting oil | | 12.09 | 2.18 | 1.81 |
| Table 2 Copper chromite | 15 | 10.94 | 1.85 | 0.53 |
| Table 2 Copper chromite | 16 | 12.05 | 1.87 | 0.86 |
| Table 3 Copper powder No treat. | 17 | 12.02 | 2.13 | 1.63 |
| Table 3 Copper powder Treat. 1 | 18 | 11.44 | 1.57 | 0.56 |
| Table 4.1 Treat. 1b World Metals | 19 | 12.33 | 2.11 | 1.64 |

TABLE 8

| Expt No. | Catalyst preparation procedure | Hydrogenation temperature (° C.) | Reaction time | C18:0 (%) | C18:1 (%) | C18:2 (%) | Final linolenic acid content (%) | Final trans fatty acid content (%) |
|---|---|---|---|---|---|---|---|---|
| | Starting oil | | | 4.3 | 22.0 | 52.85 | 7.5 | 0.2 |
| 1 | 1 | 200 | 3 hrs | 4.32 | 31.18 | 48.89 | 2.18 | 7.38 |
| 2 | 1 | 160 | 7 hrs | 4.6 | 28.64 | 50.45 | 2.8 | 5.9 |
| 3 | 2 | 200 | 1 hr | 4.63 | 32.92 | 46.21 | 1.9 | 8.7 |
| 4 | 3 | 160 | 7 hrs | 4.56 | 30.87 | 48.55 | 2.2 | 8.3 |
| 5 | 4 | 200 | 6 hrs | 4.32 | 33.14 | 47.1 | 1.94 | 9.98 |
| 6 | Commercial | 200 | 30 min | 4.20 | 30.72 | 48.79 | 1.82 | 6.94 |

Very good catalysts were obtained with all procedures. The catalyst prepared by procedure 2 was much faster than catalysts prepared by other procedures. The Mallinckrodt basic copper carbonate provided the fastest reaction, with a decrease in linolenic acid to 1.82% in 30 minutes.

Example 9

Removal of Copper Catalyst from Hydrogenation Reactions

Hydrogenation of refined bleached soybean oil was carried out using commercial copper hydroxide (CUHSULC, World Metal, LLC, Sugarland, Tex.). Catalyst (1.02 grams) was added to soybean oil (600 grams) and hydrogenation was carried out for seven hours. Removal of copper from the hydrogenated oil was carried out by vacuum filtration through a bed (70 mm diameter, 12 mm bed depth) of Celite 503 Diatomaceous Earth (World Minerals Inc., Goleta, Calif.) to obtain filtered oil containing 3.47 mg copper per kg oil. The remaining copper was removed by treating the filtered oil with a citric acid solution and activated SorbsilR92 (INEOS Silicas Americas, LLC, Joliet, Ill.;) and filtering through Celite for a second time. Filtered oil (466 grams) was heated to 80° C. and 14 drops of 40% citric acid solution was added to the filtered oil. This mixture was stirred about 15 minutes at 80° C. Sorbsil R92 (1.86 grams) was added and stirred for TABLE 9-continued

| Description | # | C18:2/C18:0 | C18:2C/18:1 | Linolenic/C18:0 |
|---|---|---|---|---|
| Table 4.1 Treat. 1c World Metals | 20 | 11.35 | 1.54 | 0.58 |
| Table 4.2 Treat. 2a World Metals | 21 | 12.00 | 2.04 | 1.53 |
| Table 4.2 Treat. 2b World Metals | 22 | 12.05 | 1.96 | 1.00 |
| Table 4.2 Treat. 2c Sigma Aldrich | 23 | 12.24 | 2.00 | 1.31 |
| Table 4.2 Treat. 2d Sigma-Aldrich | 24 | 11.30 | 1.55 | 0.65 |
| Table 4.2 Treat. 2e Sigma-Aldrich | 25 | 11.49 | 1.65 | 0.65 |
| Table 5 2a | 26 | 11.86 | 1.67 | 0.44 |
| Table 5 2b | 27 | 11.67 | 1.52 | 0.40 |
| Table 5 2c | 28 | 11.72 | 1.69 | 0.53 |
| Table 5 2d | 29 | 11.63 | 1.67 | 0.51 |
| Table 7 Control | 30 | 11.30 | 1.63 | 0.53 |
| Table 7 160° C. | 31 | 11.63 | 1.63 | 0.44 |
| Table 7 180° C. | 32 | 11.70 | 1.72 | 0.60 |
| Example 8 Mineral malachite | 33 | 7.70 | 1.10 | 3.01 |
| Table 8 Expt. 1 | 34 | 11.32 | 1.57 | 0.50 |
| Table 8 Expt. 2 | 35 | 10.97 | 1.76 | 0.61 |
| Table 8 Expt. 3 | 36 | 9.98 | 1.40 | 0.41 |
| Table 8 Expt. 4 | 37 | 10.65 | 1.57 | 0.48 |
| Table 8 Expt. 5 | 38 | 10.90 | 1.42 | 0.45 |
| Table 8 Expt. 6 | 39 | 11.62 | 1.59 | 0.43 |

Desired fatty acid profiles include those with reduced content of linolenic acid without higher levels of trans fatty acids compared to the starting oil. It is also highly desirable to carry out this reaction without reducing the content of C18:2 or C18:1 fatty acids, or increasing the content of C18:0 fatty acids.

Illustratively, vegetable oils that are hydrogenated using the processes according to the present invention can be comprised of fatty acid chains having one of the following profiles:

C18:2/C18:0 ratio above about 11.0; C18:2/C18:1 ratio no greater than about 2.2; C18:3/18:0 ratio no greater than about 1.7;

C18:2/18:0 above about 11.3; C18:2/C18:1 no greater than about 1.65; C18:3/18:0 no greater than about 0.65;

C18:2/18:0 above about 9.95; C18:2/C18:1 no greater than about 1.80; C18:3/18:0 no greater than about 0.65; and C18:2/18:0 above about 11.3; C18:2/C18:1 no greater than about 1.70; C18:3/18:0 no greater than about 0.65.

Having now fully described this invention, it will be understood to those of ordinary skill in the art that the same can be performed within a wide and equivalent range of conditions, formulations, and other parameters without affecting the scope of the invention or any embodiment thereof.

All documents, e.g., scientific publications, patents, patent applications and patent publications, if cited herein are hereby incorporated by reference in their entirety to the same extent as if each individual document was specifically and individually indicated to be incorporated by reference in its entirety. Where the document cited only provides the first page of the document, the entire document is intended, including the remaining pages of the document.

What is claimed is:

1. A process for hydrogenating a polyunsaturated compound comprising:
   placing the polyunsaturated compound in contact with a hydrogenation catalyst comprising a hydrogen peroxide-treated copper carbonate/copper hydroxide material, thus producing a mixture; and
   heating the mixture at a temperature between 50° C. and 250° C. under a hydrogen atmosphere;
   thus hydrogenating the polyunsaturated compound.

2. The process of claim 1, wherein the temperature is between 100° C. and 200° C.

3. The process of claim 1, wherein the hydrogen atmosphere is from 5 psi to 1000 psi.

4. The process of claim 1, wherein the polyunsaturated compound contains at least two sites of unsaturation in a carbon chain.

5. The process of claim 4, wherein the polyunsaturated compound is present in a composition selected from the group consisting of vegetable fat, vegetable oil, animal fat, animal oil, synthetic fat, synthetic oil, derivatives of any thereof, and mixtures of any thereof.

6. The process of claim 5, wherein the compound is an edible oil.

7. The process of claim 6, wherein the edible oil is a vegetable oil.

8. The process of claim 7, wherein the vegetable oil is selected from the group consisting of soybean oil, linseed oil, sunflower oil, canola oil, rapeseed oil, cottonseed oil, peanut oil, safflower oil, derivatives of the oils, conjugated derivatives of the oils, and mixtures of any thereof.

9. The process of claim 7, wherein the vegetable oil is hydrogenated to contain no greater than 5% linolenic acid.

10. The process of claim 7, wherein the vegetable oil is hydrogenated to contain no greater than 10% trans fatty acid (s).

11. The process of claim 10, further comprising removing the catalyst from the mixture, wherein removing the catalyst from the mixture comprises centrifugation, settling, decantation, filtration, contact with a filter aid, contact with a liquid or solid chelating agent, addition of an activated adsorbent, or any combination thereof.

12. The process of claim 1, wherein the hydrogenated compound is a vegetable oil comprising fatty acid chains having the following profile: C18:2/C18:0 ratio above 11.0; C18:2/C18:1 ratio no greater than 2.2; C18:3/18:0 ratio no greater than 1.7.

13. The process of claim 1, wherein the hydrogenated compound is a vegetable oil comprising fatty acid chains having the following profile: C18:2/18:0 ratio above 11.3; C18:2/C18:1 ratio no greater than 1.65; C18:3/18:0 ratio no greater than 0.65.

14. A process for hydrogenating a composition containing at least two sites of unsaturation comprising:
    placing the composition containing at least two sites of unsaturation in contact with a hydrogenation catalyst consisting essentially of a hydrogen peroxide-treated malachite material, wherein the treated malachite material has an improved ability to catalyze hydrogenation as compared to a non-treated malachite material, thus producing a mixture; and
    heating the mixture at a temperature between 50° C. and 250° C. under a hydrogen atmosphere;
    thus hydrogenating the composition.

15. A process for hydrogenating a compound containing at least two sites of unsaturation comprising:
    placing the compound in contact with a hydrogenation catalyst comprising an un-supported malachite material, thus producing a mixture; and
    heating the mixture at a temperature between 50° C. and 250° C. under a hydrogen atmosphere;
    thus hydrogenating the compound.

16. A catalyst for hydrogenating a composition containing at least two sites of unsaturation, consisting essentially of hydrogen peroxide-treated copper carbonate/copper hydroxide.

* * * * *